United States Patent [19]

Van Der Maaden

[11] Patent Number: 4,887,354
[45] Date of Patent: Dec. 19, 1989

[54] METHOD OF MANUFACTURING AN ELONGATE ARTICLE

[75] Inventor: Johan Van Der Maaden, Eindhoven, Netherlands

[73] Assignee: U.S. Philips Corporation, New York, N.Y.

[21] Appl. No.: 443,493

[22] Filed: Nov. 22, 1982

[30] Foreign Application Priority Data

Apr. 8, 1982 [NL] Netherlands .......................... 8201501
Sep. 1, 1982 [NL] Netherlands .......................... 8203412

[51] Int. Cl.[4] .............................................. B23P 19/04
[52] U.S. Cl. .................................... 29/868; 29/527.1; 29/433; 254/134.3 FT; 350/96.23
[58] Field of Search ...................... 29/241, 433, 527.1, 29/868; 254/134.3 FT; 350/96.23

[56] References Cited

U.S. PATENT DOCUMENTS

| | | | |
|---|---|---|---|
| 4,095,326 | 6/1978 | Harvey | 29/433 X |
| 4,337,922 | 7/1982 | Streiff et al. | 29/433 X |
| 4,355,459 | 10/1982 | Takahashi et al. | 29/433 X |
| 4,793,048 | 12/1988 | Kashiwaya et al. | 29/433 X |

Primary Examiner—Timothy V. Eley
Attorney, Agent, or Firm—David R. Treacy

[57] ABSTRACT

A method of manufacturing an elongate article, in particular an optical cable which comprises a carrier member having channels or bores and is provided with elongate elements, for example, optical fibres, the elongate element being inserted into the end of a channel or bore and the carrier member being subjected to a periodic movement, the elements moving in the channel or bore under the influence of the movement and as a result of their mass inertia.

The invention also relates to a device for carrying out the method and to elongate articles, for example, optical cables manufactured by means of the method.

23 Claims, 2 Drawing Sheets

METHOD OF MANUFACTURING AN ELONGATE ARTICLE

BACKGROUND OF THE INVENTION

The invention relates to the manufacture of elongate articles comprising one or more elongate elements each loosely arranged within one or more channels or bores extending in the longitudinal direction of a carrier member, the diameter of the channel or bore being larger than that of the element.

Elongate article, carrier member or element is to be understood to mean a product the longitudinal dimension of which is much larger than the thickness or the diametrical dimension. The ratio length-diameter is at least 500 and will as a rule be 50,000 or more.

Such articles of large longitudinal dimensions can be manufactured, for example, by extruding a carrier member in the form of a separate tube around the elongate element. The element passes in a usual manner through a central aperture of a nozzle with which the separate tube is extruded around the element.

This known process has disadvantages if the element has a fragile character, because damage is apt to occur. Moreover, technologically, the process is less suitable or cannot be used for the manufacture of more complicated articles in which the article comprises many elements which are situated closely together but are separated from each other.

Due to the great importance of the method in accordance with the invention for the manufacture of optical cables or cable elements, the explanation hereinafter is directed mainly to the manufacture of optical cables and cable elements. It is emphasized that the method is not restricted hereto.

The manufacture of an optical cable or cable element presents the problem that an extremely fragile optical fibre has to be handled which is vulnerable both optically and mechanically. The optical fibre is normally a glass fibre which is coated with a thin so-called primary coating which is to protect the surface from damage. The fibre may also be a fibre of synthetic resin. The optical fibre exclusive of the primary coating has a diameter of approximately 125 /$\mu$m and is very sensitive to fracture. Under the influence of mechanical stress the quality of the optical fibre can deteriorate considerably especially in the presence of moisture (stress corrosion).

In addition to the sensitivity to thermal and mechanical loads the optical fibre has the disadvantage that the thermal expansion differs considerably from that of the material with which the fibre is usually enveloped and protected during the manufacture of an optical cable. During the manufacture of an optical cable as well as in the manufacture of an electrical cable, synthetic resins are frequently used, in particular extrusile plastic synthetic resins whose coefficient of expansion is many times larger than that of the optical fibre. In the event of temperature variations the synthetic resin cladding of an optical fibre will show a much greater variation in length than the optical fibre itself. The differential in expansion may lead to an unacceptable deterioration in the optical and mechanical quality of the fibre. As a first self-supporting envelope of the optical fibre, a loose so-called secondary coating is therefore often used within which the optical fibre has some freedom of movement.

In a known and frequently used embodiment the optical cable element comprises an optical fibre and a loose coating of synthetic resin provided around the fibre by an extrusion process. As a result of the fragile character of the optical fibre the extrusion process must be carried out very carefully, and in particular stringent process parameters have to be observed. An additional disadvantage of the known process is that the high temperature of the extruded synthetic resin forms a thermal load for the optical fibre. In addition, upon cooling and solidification of the extruded coating, a considerable shrinkage will occur. After-shrinkage of the extruded coating also often occurs for a long period of time.

A number of the elementary cable elements thus manufactured may be twisted, for example, around a central strength member of metal or of a reinforced synthetic resin. The resulting elements may be provided with one or more protective coatings and/or be twisted to form larger elements or cables which in turn are provided with an outer sheath.

According to another known process of manufacturing a cable element, a synthetic resin-cladded aluminum foil is folded in a special manner so that in the longitudinal direction of the foil parallel open channels are formed having, for example, a cross-section in the form of a trapezoid. Optical fibres are laid in the channels and the foil is then covered with a second foil folded in the same manner, closed channels having cross-sections in the form of a regular hexagon being formed. The second foil may be connected to the first foil by means of glue or may be fused to the first foil by means of a thermal treatment. If desired, several of the cable elements thus formed may be stacked one on top of the other, an optical cable being formed which in cross-section has a honeycomb structure. The method is rather critical because the second foil must be accurately and carefully placed, glued, or bonded into the first foil. Moreover, the optical fibre should not be damaged.

An SZ form is a known and interesting configuration of an optical fibre. It is a spiral form having alternately left-hand and right-hand pitch. In still another known process of manufacturing an optical cable element the starting material is a central core of synthetic resin which may be reinforced, for example with metal. Grooves which extend in the longitudinal direction of the core and mutually have a spiral shape or SZ shape are provided in the surface of the synthetic resin. Optical fibres are laid in the grooves and the surface of the grooved core is then covered with an extruded sheath of synthetic resin. In this process also a thermal load of the optical fibre and a considerable shrinkage of the synthetic sheath occur.

The above-mentioned known processes have in common that the structure of the cable from the first stage, at the time that the first loose coating is provided, takes place in the presence of the very vulnerable optical fibre. This approach presents serious problems as they are stated by way of example in the preceding paragraph. Another serious disadvantage of the known processes is that it is very difficult or substantially impossible to realize a defined overlength of the optical fibre within the carrier member. A defined overlength of the optical fibre is of great importance, for example, upon bending an optical cable or cable element and for a good thermomechanical behaviour. Since it is necessary to expose the optical fibre as little as possible to thermal and mechanical loads, the process choice and the choice of the enveloping or coating material are furthermore very much restricted.

German Offenlegungsschrift 26 35 979 discloses an optical cable which comprises optical fibres or bundles of optical fibres within a protective sheath of metal. It appears from FIGS. 1 and 2 of the Offenlegungsschrift that the diameter of the protective sheath is very much larger than that of the optical fibres. Furthermore it is not clear in what manner the optical fibre shown in FIG. 1, in which a seamless protective sheath of metal is used, must be manufactured.

German Offenlegungsschrift 30 00 109, to which U.S. Pat. No. 4,332,436 corresponds, discloses a process of manufacturing an optical cable in which one or more optical fibres are introduced in a capillary tube of metal by means of a flow of liquid. The process is inert with a rate of introduction of 5 meters per minute. The overall length of optical fibre which can be introduced is comparatively small. A length of 150 meters is mentioned on page 9. It is stated that larger lengths of optical fibre can be introduced in the case of very high liquid pressures. The high pressure is a serious disadvantage because expensive tubes of metal having large wall thicknesses have to be used. Moreover, the real danger exists that stress corrosion of the optical fibre occurs in the presence of moisture (water). Due to the necessary liquid flow the process is less suitable for practical applications. In this case also it holds that it is not possible to provide a defined overlength of optical fibre in the metal tube.

SUMMARY OF THE INVENTION

The invention provides a method which can be used universally, and is particularly suitable for handling vulnerable elements and/or for the manufacture of articles of a slightly more complicated construction than the above-illustrated single tube with an elongate element therein.

In addition, using the method in accordance with the invention, a readily defined overlength of optical fibre in the carrier member can be realized.

According to the invention, a method as described in the opening paragraph is characterized in that one or more elements is or are inserted over a small length into the end of a channel or bore, the carrier member or a part of the carrier member is subjected to a periodic movement, and the carrier member is periodically returned to its initial position, so that the element is moved in the longitudinal direction into the channel or bore as a result of the mass inertia of the element and under the influence of the periodic movement.

In a preferred embodiment both the carrier member and the element are flexible. Technological advantages are obtained because the carrier member can be coiled before insertion and as a result can be simply subject to the periodic movement.

The method according to the invention is particularly suitable for the manufacture of cables or cable elements. This applies even more strongly to the manufacture of optical cables or cable elements, in which the above-mentioned elongate element is an optical fibre.

In this second preferred embodiment of the method in accordance with the invention a cable or cable element is manufactured which comprises one or more electrical and/or optical conductors that is, conductors for electromagnetic energy extending in one or more channels or bores which extend in the longitudinal direction of the elongate carrier member, characterized in that one or more conductors is or are inserted over a small length into the end of a channel or bore, the carrier member or a part of the carrier member is subjected to a periodic movement, the carrier member periodically returning to its initial position, and in which the conductor(s) move(s) in the longitudinal direction of the channel or bore as a result of the mass inertia and under the influence of the said periodic movement.

The method according to the invention can be carried out at normal temperature and pressure. Flows of liquid are not used. There is no thermal load of the optical fibre(s). There is no compression or tensile load on the fibre(s) as a result of shrinkage phenomena.

According to the method of the invention it is possible to previously manufacture the whole cable, the conductors excepted, and to introduce the optical conductors into the relevant bores or channels of the cable as the last step.

The terms cables and conductors are to be understood to include herein and hereinafter cables and conductors for electromagnetic energy or signals, that is, both optical and electrical cables and optical and electrical conductors. Preferably, mainly optical cables and optical conductors (fibres) are concerned in particular.

The method according to the invention also presents the possibility that carrier members of a variety of constructions and manufactured from materials of a variety of natures and compositions can be used. The only condition is that the carrier member comprises channels which extend in the longitudinal direction and in which the conductors can be introduced. In choosing the construction and material of the carrier member the fragile character of the conductors, in particular the optical fibres, need not or need only slightly to be taken into account —because they are inserted only afterwards - and there is no pressure load on the carrier member during introducing the fibres. This in contrast with the pressure load which occurs upon introducing optical fibres by means of flows of liquid as described in the above-mentioned Offenlegungsschrift 30 00 109.

So far as the carrier member is concerned, there is a great variety of materials which may be used; for example, organic materials, in particular synthetic resins or tensile fibre-reinforced synthetic resins and inorganic materials, in particular glass and metals.

As already stated, one or more elements such as conductors inserted into a bore or channel of the carrier member will move in the longitudinal direction of the carrier member as a result of the periodic movement of the carrier member in which said member periodically returns to its initial position. The mass inertia of the elements, such as conductors, plays an important role. Due to its mass inertia the elongate element cannot completely follow the periodic movement of the carrier member and will show a relative movement with respect to the carrier member and in the longitudinal direction of the carrier member. As a result of this the element or conductor inserted into the end of a channel or bore will traverse the carrier member. An example of a periodic movement imparted to the carrier member is an eccentric rotation in which the element or conductor moves in the bore or channel as a result of an oscillatory motion.

A very suitable periodic movement is a vibrating motion or a periodic pulsatory motion. The vibrating motion may be both linear and rotating. A pulsatory movement is obtained by giving the carrier member periodically a pulse (mv, where m=mass and v=velocity) in the longitudinal direction. The carrier member is returned to its initial position after each pulse. It may be compared with the movement of a "hammer head" along a hammer handle by periodically giving the handle a pulse in the longitudinal direction, for example, by tapping the handle on the floor.

In a preferred embodiment of the method in accordance with the invention the carrier member is subjected to a harmonic vibration in which the direction of vibration makes an angle with the longitudinal direction of the carrier member.

The direction of vibration preferably makes an angle of 1°–20° and in particular 3°–7° with the longitudinal direction of the carrier member. In a further preferred embodiment the carrier member is subjected to a harmonic vibration which has a frequency of 1–500 Hertz and a horizontal amplitude component from 0.1 to 10 mm.

The frequency is preferably 10–150 Hertz. The horizontal amplitude component is preferably 0.5–4 mm.

The velocity with which the element or conductor moves in the channel or bore depends on various factors, for example; the type of the periodic movement imparted to the carrier member; the mass inertia of the element; the friction between the element and the wall of the bore or channel; the ratio of the diameter of channel or bore and that of the element; the angle which the periodic movement, for example a linear harmonic vibration, makes with the longitudinal direction of the carrier member; and the frequency and amplitude of the periodic movement.

When the abovedescribed harmonic vibration is used the velocity of moment is relatively high, and is approximately 10–40 meters per minute for an optical fibre. The covered path may be very large and is, for example, from 200 to 2000 meters.

The diameter of bore or channel may be chosen to be very small. The ratio of the diameter of channel or bore and the diameter of the element c.q. conductor preferably has a value of 2–8 and in particular a value of 2–6. The diameter of an optical fibre is that of the fibre and the primary coating present. As a rule the diameter of the fibre with primary coating is 250 /$\mu$m. The diameter of the bore or the channel then is 0.5–2 mm and in particular 0.5–1.5 mm.

The friction between the element and the wall of the channel or bore is preferably small so that a "stick-slip" of the element is avoided. In this connection it is to be noted that in an optical fibre the primary coating is preferably a hard coating manufactured from a radiationpolymerized coating, such as a coating based on acrylates.

The method in accordance with the invention can be carried out with unskilled personnel. The apparatus required for performing the process is cheap and rugged.

In a preferred embodiment of the method in accordance with the invention the carrier member is detachably connected to a vibrating or shaking device, the element or conductor moving in the longitudinal direction of the channel or bore as a result of the conductor mass inertia and under the influence of the periodic movement imparted to the carrier member by the vibrating or shaking device.

A suitable vibrating or shaking device is, for example, a vibratory hopper which is used in the technical industry to supply usually small articles as electrical components, to a processing or packaging machine in an ordered sequence, for example, in the form of a row of "head-to-tail" components.

In a further preferred embodiment the carrier member is wound on or around a supporting member connected to the vibrating or shaking device, the elongate element or the conductor moving in the longitudinal direction of the channel or bore under the influence of the periodic movement imparted to the carrier member through the supporting member and as a result of the mass inertia of the element.

Examples of a supporting member are a supporting plate, a supporting post or a cylindrical member, for example, a reel.

A carrier member comprising one or more tubular bodies is preferably used in the method in accordance with the invention, one or more conductors being inserted into the end of a tubular member and the carrier member being subjected to a periodic movement.

In the simplest embodiment the carrier member is one tube manufactured, for example, from a plastic or crosslinked synthetic resin, for example, a tube of polyethylene, polypropylene, polyvinyl chloride, polyvinylidene fluoride, polycarbonate, polysulphone, polymethyl methacrylate or polytetrafluoroethylene. One or more conductors are introduced in the finished tube under the influence of the periodic movement and thus cable element is obtained.

During the manufacture of the element no thermal load of conductor, in particular of optical fibre, takes place. The applied tube is a chemically stable product at a temperature which corresponds to that of the atmosphere. There is no shrinkage of the tube. If desired, possible after-shrinkage of the tube can be prevented by subjecting the tube to an ageing process prior to the manufacture of the element.

In particularly preferred embodiment a tubular body is used having a length of at least 200 meters and having an inside diameter which is a factor 2–8 larger than the diameter of the introduced conductor.

In case of an optical fibre, such a tubular body serves as a loose self-supporting secondary coating.

In a further favorable embodiment the tubular member is manufactured from an inorganic material or from a synthetic resin comprising tensile fibres.

A suitable inorganic material is notable glass or a metal.

A secondary coating of metal can be manufactured, for example, by means of a drawing process in which by using a die, a metal tube of a large diameter is reshaped into a tube having a small diameter with simultaneous increase in length. The metal coating may alternatively be made by an extrusion process in which generally a high extrusion temperature is used. The melting-points of metal or glass are considerably higher than those of plastic synthetic resins. The high temperature causes no objection whatsoever because in the manufacture of the secondary coating (a) conductor(s), in particular (an) optical fibre(s), is(are) not present. The secondary coating can also be manufactured from a metal tape by folding it longitudinally or winding it transversely, preferably with overlap, and sealing the seams, for example, by a welded or soldered joint or by using a glue. When a glue is used the overlapping parts of the coating must be subjected to quite some pressure. This is not a problem because, as already explained, no conductor, and in particular no optical fibre, is present. The same applies to the thermal energy released upon welding or soldering. If desired the secondary coating of metal or of glass may be provided on the inside and/or on the outside with a layer of synthetic resin, for example, an extruded inner coating and/or outer coating. An inner coating may very readily serve as a substratum upon folding or winding the metal tape and upon making a glued joint. Roughness, if any, of the metal coating is also masked by a layer of synthetic resin.

A secondary coating (tube) of metal or glass has an excellent tensile strength and an excellent watertightness. Moreover, the very important advantage is obtained that the coefficient of expansion fits much better with that of an optical fibre. A secondary coating of glass even has the same coefficient of expansion. Suitable metals are, for example, aluminum, copper or steel. Another example of a secondary coating having a good tensile strength is a coating manufactured from a synthetic resin comprising tensile fibres, for example, glass fibres, carbon fibres or polyamide fibres, or a coating manufactured from a high tensile synthetic resin, for example, polyarylethers.

The carrier member used in the method according to the invention may also comprise a strength member and one or more hollow tubes which extend parallel to the strength member or are provided on or around the strength member in a spiral form as described above or SZ form, a conductor and notably an optical fibre being inserted into the end of a hollow tube and the carrier member being subjected to a periodic movement.

According to this embodiment the conductors and notably the optical fibres are inserted in a later stage into the hollow tube (secondary coating); that is, after the hollow tubes have been combined together with a die.

This also holds true for another embodiment of the method in accordance with the invention in which a carrier member is used which comprises a core which has one or more grooves which are provided in the surface of the core and which are covered with one or more protective layers. Preferably these grooves extend parallel to the axis of the core or have a spiral form or SZ form, a conductor and in particular an optical fibre being inserted into the end of a groove and the carrier member being subjected to a periodic movement.

The protective layers, for example, are extruded layers of synthetic resin and/or wound foils. Since the grooves are covered with one or more protective layers, closed channels or bores are formed extending in the longitudinal direction of the carrier member. The optical fibre(s) is (are) inserted into the channels or bores.

In another preferred embodiment of the method in accordance with the invention an elongate body of synthetic resin is used as a carrier member which comprises one or more channels extending in the longitudinal direction. The elongate body is obtained by an extrusion process in which after extrusion the synthetic resin body is drawn down, one or more conductors being inserted into the end of a channel and the body being subjected to a periodic movement.

The process in which a body of synthetic resin after extrusion is drawn down is termed a draw down process or spinning process. The body of synthetic resin is subjected to such a pulling force that a considerable increase in length occurs with a simultaneous decrease of the cross-sectional area of the body. Upon drawing down a tubular body of synthetic resin the length becomes many times larger while the diameter and the wall thickness of the tube decrease. Elongate articles of synthetic resin can be manufactured by means of a draw down process at a high-production speed and at low cost. A draw down process is suitable in particular to manufacture elongate articles of synthetic resin of a great length, for example, in a length of several kilometers, the article also comprising channels which extend in the longitudinal direction and have small diametrical dimensions, for example, a diameter of 0.4 to 1.5 mm.

A cable element or cable and in particular an optical cable element or cable having a carrier member of a drawn down synthetic resin manufactured by the method of the invention is a novel product. Such a cable or cable element cannot be manufactured according to the conventional methods.

In yet another preferred embodiment of the method in accordance with the invention a ribbon-like body of drawn down synthetic resin is used as a carrier member which comprises several juxtaposed and parallel channels, one or more conductors being inserted into the end of a channel and the member being subjected to a periodic movement.

The resulting ribbon-like cable element is very suitable to be further processed, if so desired, to form a larger optical cable. For example, several ribbon-like elements may be stacked and the resulting packet may be enveloped by a tube of synthetic resin which may be reinforced, for example, by means of steel litzwires or glass fibres. One or more ribbon-like elements may also be wound around a central core which consists, for example, of a steel litzwire enveloped by synthetic resin and an outer coating of synthetic resin may then be provided by extrusion.

Not all channels or bores of the elongate carrier member need be provided with one or more optical fibres. In accordance with the wishes and needs of the customer a part of the available channels or bores may be provided with conductors and in particular, optical fibres. This means a great flexibility. The process technical and economical advantage is also obtained that a standardized supporting member can be used, such as a ribbon-like product of synthetic resin of, for example, 1000 meters length and having 100 channels. A part of the 100 channels is provided at will with conductors.

In still another preferred embodiment of the method in accordance with the invention one or more auxiliary wires are inserted into one or more of the remaining bores or channels; that is, into bores or channels which comprise no conductors or are not occupied entirely by conductors. The introduction of the auxiliary wires is carried out in the same manner as that of the optical fibres, under the influence of the periodic movement of the carrier member and as a result of the mass inertia of the auxiliary wires. Examples of interesting auxiliary wires are identification (marker) wires, for example, coloured glass fibres. When the mass inertia of the auxiliary wires is insufficient, for example, when textile auxiliary wires are used, the wire may be provided at one end with an element which increases the mass inertia, for example, a blunt needle. The same measure may also be used, if desired, when conductors such as optical fibres are introduced.

As already stated, the method of the invention presents the advantage that an overlength of optical fibre can simply be provided. For this purpose, after the optical fibre has been introduced over the full length of a channel or bore and the output end of the channel or bore has been closed or blocked otherwise, the periodic movement may be continued for some time until no further input of the fibre into the channel or bore takes place. The overlength is maximum. The input end of the channel or bore is then blocked and the output end is opened. The periodic movement is again started until the maximum length of fibre projecting from the output end has been reached. Herewith the maximum overlength is known and the desired overlength can very accurately be introduced by blocking the output end.

Another advantage of the method in accordance with the invention is that an optical fibre present in a channel or bore and which, for example, is damaged or even broken, can easily be removed by causing the damaged and/or broken fibre to emanate from the bore or channel under the influence of a periodic movement imparted to the carrier member. The bore or the channel must not be closed on at least one end.

The invention also relates to elongate articles manufactured by using the method in accordance with the invention.

The invention further relates to new cable elements and cables.

The invention relates more in particular to a novel cable element or cable in particular an optical cable element or cable comprising a conductor and a coating of inorganic material present around the conductor, the coating having a length of at least 200 meters and an inside diameter which is a factor 2 to 8 larger than the diameter of the conductor.

The conductor used in the cable element or cable will, in the case of an optical fibre, generally be provided with a primary coating. In that case the diameter of fibre including the primary coating must be used as a diameter of the optical fibre. The optical fibre without primary coating generally has a diameter of 125 $\mu$m and a diameter of 250 /$\mu$m including the primary coating.

In a preferred form of the cable element or cable in accordance with the invention the coating is a seamless tube of glass or metal.

Another cable element or cable, in particular an optical cable element or optical cable, in accordance with the invention comprises an elongate carrier member of a drawn down synthetic resin which comprises one or more channels extending in the longitudinal direction, all channels or a part of the channels comprising conductors and the diameter of a channel being larger than that of the conductor.

The diameter of the channel is preferably at least 2 times as large as the diameter of the conductor and will in particular be a factor 2-8 larger than that of the conductor. The channels may have a circular cross-section. Other cross-sections are also possible, for example, a cross-section in the form of a rectangle and square. In the latter cases preferably both the length and the width of the rectangle or square is at least a factor 2 larger than the diameter of the conductor.

Still another cable, element or cable in particular an optical cable element or optical cable in accordance with the invention, comprises an elongate carrier member which has several channels or bores extending in the longitudinal direction of the carrier member, a part of the channels comprising one or more conductors, one or more of the remaining channels comprising one or more auxiliary wires, the diameter of a channel or bore being larger than that of the conductor or auxiliary wire.

In this case also it holds that preferably the diameter of a channel or bore is at least a factor 2 larger than that of the conductor and in particular is a factor 2-8 larger.

The above-described novel cable elements or cables in accordance with the invention can be manufactured according to the method described above.

The invention also relates to a device for carrying out the method.

The device in accordance with the invention comprises a supporting member, activating means which cooperate with the supporting member and which are suitable to impart a periodic movement to the supporting member, as well as connection means with which an elongate carrier member can be detachably connected to the supporting member.

In a preferred form of the device the activation means comprise a vibratory generator or a pulsatory generator. Herewith a vibrating movement and a pulsatory movement, respectively, can be imparted to the supporting member. The supporting member is, for example, a supporting plate, a supporting chute or a cylinder. The elongate carrier member is preferably wound on or around the supporting member, the carrier member being rigidly connected to the supporting member by using the connection means. As a result of this the periodic movement of the supporting member is well transmitted to the carrier member. The connection means preferably comprise a clamping device, for example clamping braces or a pressure plate which forcibly urges the carrier member on the supporting member, for example, by using a vacuum pump.

The invention will be described in greater detail with reference to the drawing.

DESCRIPTION OF THE PREFERRED EMBODIMENTS

Figure 1:
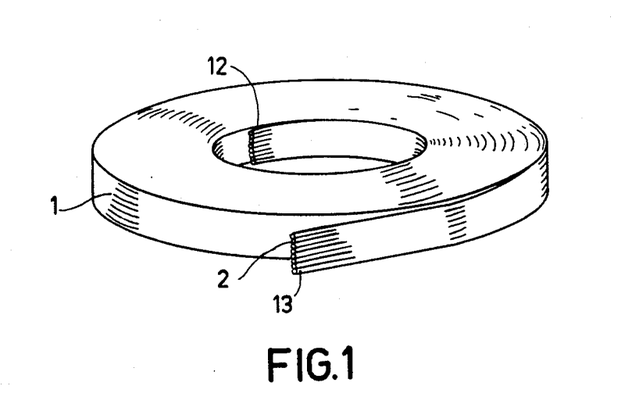
FIG. 1 is a plan view of a ribbon-like carrier member especially useful in practice of the invention.

In FIG. 1, reference numeral 1 denotes a ribbon-like carrier member of reinforced polysulphone. Ribbon 1 has a width of 7.3 mm, a thickness of 1 mm and a length of 1000 meters. Ribbon 1 comprises eight channels 2 which extend in the longitudinal direction of the ribbon and which extend mutually parallel and have a circular or a rectangular cross-section of 0.8×0.8 mm.

Figure 2:
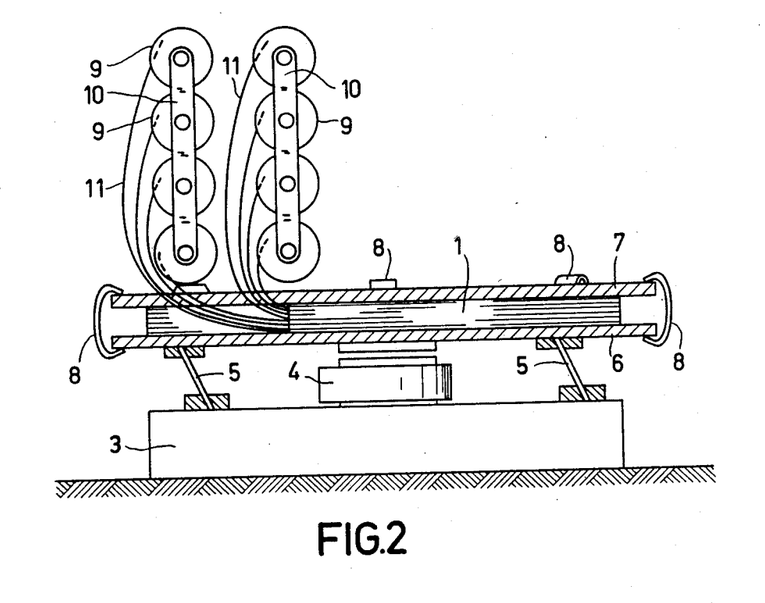
FIG. 2 is a sectional view of a vibrating device for carrying out the method according to the invention.

Reference numeral 3 in FIG. 2 denotes a supporting member which has an electromagnet 4 and two leaf springs 5. Electromagnet 4 and leaf springs 5 are connected to a vibrating table 6 at the end remote from the supporting member 3. The spring angle B which the leaf springs 5 make with the vertical of the supporting member 3 is 5°.

The carrier member 1 shown in FIG. 1 is present on vibrating table 6 which has a diameter of approximately 1.5 meters. Carrier member 1 is forcibly urged on vibrating table 6 by means of a clamping plate 7 and clamping braces 8 which engage around clamping plate 7 and vibrating table 6. Eight reels 9 are provided above clamping plate 7 in a holder 10. Reels 9 are each provided with an optical fibre 11 having a length of 1 kilometre. The optical fibre has a diameter of 125 /μm and comprises a primary coating of a UV-light-cured lacquer. The overall diameter of fibre with coating is 250 /μm.

The operation of the device is as follows. The end of each fibre is inserted over a small distance of, for example, 50 cm into a channel 2 of carrier member 1. By activating the electromagnet a substantially translational harmonic vibration is imparted to vibrating table 6 and the carrier member 1 clamped thereon. The frequency is 100 Hertz. The horizontal amplitude of the vibration from peak to peak is approximately 1.6 mm in the input longitudinal direction transverse to the leaf springs. As a result of the vibrating movement carried out by the carrier member 1 and under the influence of their mass inertia, the optical fibres 11 move in the longitudinal direction of the respective channels 2. The rate of movement is 25 meters/min. After the fibres have moved over the full length of the carrier member the channels 2 and the output end 12 of carrier member 1 are blocked. The vibration is continued until no further input of fibres 11 in channels 2 takes place. In this situation the overlength of an optical fibre 11 in a channel 2 is maximum. The fibre then is present entirely in the outside bend of the wound carrier member 1. The input member 13 of carrier member 1 is blocked while the output end 12 is released. The carrier member is again subjected to the vibrating movement. As a result of this the ends of the optical fibres 11 emanate from the output end 12 of carrier member 1. The vibrating movement is continued until no further movement of fibres 11 takes place any longer. The length of the fibres in the carrier member is minimum. The fibres are present in the inside bend of the wound carrier member. The distance over which the fibres emanate from the output end 12 of carrier member 1 is measured. This length is a measure of the maximum overlength of fibres 11 in member 1. The output end 12 of the carrier member 1 is now blocked and the input end is released. The carrier member 1 is subjected to the vibratory movement in which any desired overlength of optical fibres is introduced into the carrier member 1. In the same manner as described hereinbefore, electrical conductors, for example, copper wires, may be introduced into ribbon 1 instead of optical fibres, so that an electrical ribbon cable is obtained. The electrical ribbon cable according to the invention has significant advantages when compared with a known embodiment of an electrical ribbon cable. The known electrical ribbon cable is manufactured by extruding a hollow tube of synthetic resin around the electrical conductors which are situated in a flat plane and extend in parallel, pressing the tube on the conductors by means of sub-ambient pressure, and firmly pressing the wall parts of the tube of synthetic resin present between the conductors on each other by means of a roller. Some of the said advantages are a better strippability, greater flexibility, and better defined insulating capacity and the possibility of using in a simple manner electrical conductors of different diameters in the channels 2.

Figure 3:
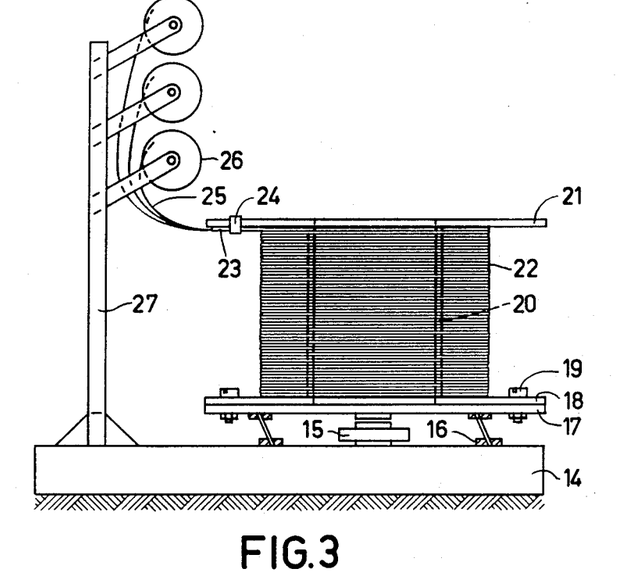
FIG. 3 is a partial cross-sectional of another embodiment of a device for carrying out the method in accordance with the invention.

Reference numeral 14 in FIG. 3 denotes a supporting member which has an electromagnet 15 and two leaf springs 16 which are connected to a vibrating plate 17 on the side remote from the supporting member 14. The spring angle B of the leaf springs, i.e. the angle between leaf spring and the vertical on the vibrating plate, is 3°.

A reel 18 is connected to vibrating plate 17 by means of bolts 19. The cylindrical housing 20 of reel 18 has a diameter of 20 cm and a height of 25 cm. The diameter of the circular reel walls 21 is 30 cm. A carrier member in the form of a tube 22 manufactured from polyvinylidene fluoride is wound on reel 18. The outside diameter of tube 22 is 1.5 mm; the inside diameter is 1 mm. Tube 22 has a length of approximately 1080 meters. The number of winding layers of tube 22 around the cylindrical housing 20 is 10.

The end 23 of tube 22 is connected to reel wall 21 by means of a clamp 24. Three optical fibres 26 are inserted into the end 23. The length of the part of the optical fibres which is inserted into the end 23 is approximately 20 to 30 cm. Each optical fibre has an overall length of approximately 1080-1090 meters and is wound on a supply reel 26. Supply reels 26 are connected to holder 27.

By activating the electromagnet a harmonic vibration is imparted to vibrating plate 17, reel 18 and a carrier member 22. The vibration has a frequency of 50 Hertz and horizontal peak-to-peak amplitude of 4.0 mm. Under the influence of the vibration imparted to the carrier member 22 and as a result of the mass inertia of optical fibres 25, fibres 25 move in the longitudinal direction of the carrier member (tube) 22. The rate of movement is approximately 20 meters per minute. After approximately 50 minutes tube 22 is provided over its overall length with three optical fibres 25. In the same manner as described with reference to FIG. 2 an overlength of optical fibres 25 in tube 22 can be provided.

Tube 22 may be manufactured from a synthetic resin, for example as described above, but may also be made from an inorganic material, for example a metal tube, in particular a copper tube or a glass tube. Advantages of these inorganic materials are a good tensile strength and watertightness.

Figures 4, 5:
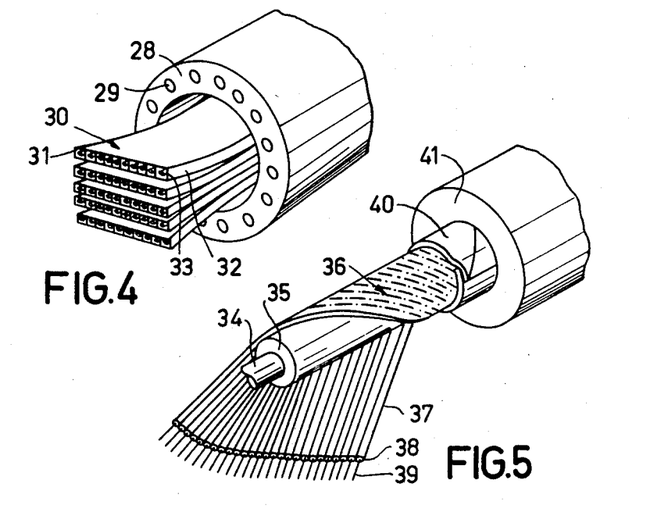
FIG. 4 is an elevation of an optical cable according to the invention.
FIG. 5 is an elevation of another embodiment of an optical cable in accordance with the invention.

Reference numeral 28 in FIG. 4 denotes a cylindrical sheath of synthetic resin manufactured, for example, from polyethylene and having reinforcement elements 29 which extend in the longitudinal direction of the sheath and are embedded in the synthetic resin and which are manufactured, for example, from twisted steel wires. Five optical cable elements 30 extend inside the sheath 28. Each cable element comprises a carrier member 32 manufactured from a drawn down synthetic resin and having ten channels 31. An optical fibre 33 is present in each of the channels.

Reference numeral 34 in FIG. 5 denotes a steel core. The core has a coating 35 of a synthetic resin, for example polyethylene. An optical cable element 36 is wound around synthetic resin coating 35 and has a carrier member 37 of a drawn down resin which comprises twenty-five channels 38 extending in the longitudinal direction of the carrier member 37. The channels have an inside diameter of 1 mm and each comprise an optical fibre 39 having a primary coating of synthetic resin not shown. A foil 40 of, for example, polyester is wound around the carrier member and in turn is coated with a sheath 41 of polyethylene synthetic resin.

What is claimed is:

1. A method of manufacturing an elongate article comprising one or more elongate elements disposed within respective channels extending in the longitudinal direction of an elongate carrier member, cross section dimensions of each channel being larger than corresponding cross section dimensions of the respective element disposed within said channel, characterized by the steps of:

inserting at least one elongate element a small distance into the end of a channel, and then subjecting at least a part of the carrier member to a periodic movement, returning the carrier member to its initial position periodically, and selecting the magnitude and acceleration of said periodic movement and return such that the elongate element is moved in the longitudinal direction of the channel into the channel as a result of the mass inertia of the element.

2. A method as claimed in claim 1, for inserting a flexible element into a flexible carrier member, characterized in that substantially the entire length of said carrier member is coiled around a support prior to and during said inserting and subjecting steps.

3. A method as claimed in claim 2, characterized in that said subjecting and returning steps consist of subjecting the carrier member to a substantially translational harmonic vibration, the direction of vibration being inclined at an angle with respect to the input longitudinal direction of the carrier member.

4. A method as claimed in claim 3, characterized in that said angle is an angle between approximately one and twenty degrees.

5. A method as claimed in claim 4, characterized in that the harmonic vibration has a frequency between approximately one and five hundred Hertz and a horizontal amplitude component between approximately 0.1 and 10 mm.

6. A method as claimed in claim 3, characterized in that said angle is an angle between approximately three and seven degrees.

7. A method as claimed in claim 6, characterized in that the harmonic vibration has a frequency between approximately ten and one hundred and fifty Hertz and a horizontal amplitude component between approximately 0.5 and 4 mm.

8. A method of manufacturing a cable for electromagnetic energy comprising an elongate carrier member having at least one bore extending in the longitudinal direction of the carrier member and at least one conductor disposed within a respective bore, the diameter of the bore being larger than that of the respective conductor disposed within said bore, characterized by the steps of inserting at least one conductor a small distance into the end of a bore of the carrier member, subjecting at least a part of the carrier member to a periodic movement, and returning the carrier member to its initial position periodically, thereby moving the conductor in a longitudinal direction into the bore as a result of the mass inertia of the conductor, under the influence of the periodic movement.

9. A method as claimed in claim 8, characterized by the additional step of detachably connecting the carrier member to a shaking device, said subjecting and returning steps being performed by movements of said device.

10. A method as claimed in claim 9, characterized by coiling said carrier member on a supporting member prior to said inserting step, and performing said subjecting and returning steps by imparting movement to the carrier member through the supporting member.

11. A method as claimed in claim 10, characterized in that the carrier member is at least 200 meters long, said bore having an inside diameter which is between two and eight times larger than the diameter of the inserted conductor.

12. A method as claimed in claim 11, characterized in that the carrier member is at least 200 meters long, said bore having an inside diameter which is between two and six times larger than the diameter of the inserted conductor.

13. A method as claimed in claim 11, for providing an overlength of conductor in a carrier member having an output end, comprising blocking the output end of the carrier member, continuing said subjecting and returning steps until input of the conductor into the bore stops, whereby a maximum overlength of conductor has been inserted, and opening said output end and then continuing said subjecting and returning steps until a given length of conductor projects from the output end.

14. A method as claimed in claim 8, characterized by forming said carrier member by extruding a body of synthetic resin having a bore, and then drawing down said body to the dimensions of the carrier member.

15. A method of manufacturing a plural conductor cable as claimed in claim 14, characterized in that the body of synthetic resin has a plurality of bores, and is drawn into a ribbon-like shape so as to have a plurality of juxtaposed parallel bores; and the drawing step is followed by inserting a plurality of conductors into respective bores, and then performing said subjecting and returning steps whereby a plurality of conductors are simultaneously moved by mass inertia into said bores.

16. A method of manufacturing a fiber optic cable, as claimed in claim 15, characterized in that the carrier member is drawn to a length of at least 200 meters, said conductors are optical fibers drawn to a length of at least one kilometer and coiled on respective reels, and said subjecting and returning steps impart relative movement of the fiber into the carrier member of at least approximately 20 meters per minute.

17. A method as claimed in claim 15, characterized by coiling said carrier member around a supporting member and connecting the supporting member to a shaking device, prior to said inserting step, coiling said conductors on a respective plurality of feed reels, and then inserting a free end of each respective conductor into a respective bore, and performing said subjecting and returning steps by imparting movement periodically to the carrier member through the supporting member for simultaneously moving said conductors into the carrier element.

18. A method as claimed in claim 17, characterized in that said subjecting and returning steps consist of subjecting the carrier member to a harmonic vibration, the direction of vibration being inclined at an angle with respect to the longitudinal direction of the carrier member.

19. A method as claimed in claim 18, characterized in that the harmonic vibration has a frequency between approximately one and five hundred Hertz and a horizontal amplitude component between approximately 0.1 and 10 mm.

20. A method as claimed in claim 18, characterized in that said angle is an angle between approximately one and twenty degrees.

21. A method as claimed in claim 20, characterized in that the harmonic vibration has a frequency between approximately one and five hundred Hertz and a horizontal amplitude component between approximately 0.1 and 10 mm.

22. A method as claimed in claim 20, characterized in that said angle is an angle between approximately three and seven degrees.

23. A method as claimed in claim 22, characterized in that the harmonic vibration has a frequency between approximately ten and one hundred and fifty Hertz and a horizontal amplitude component between approximately 0.5 and 4 mm.

* * * * *